United States Patent Office 3,563,922
Patented Feb. 16, 1971

3,563,922
**METHOD OF REGENERATING VULCANIZED RUB-
BER, RESULTING PRODUCTS, AND COMPO-
SITIONS CONTAINING THE REGENERATED
PRODUCTS**
Jean-Marie Massoubre, Clermont-Ferrand, France, as-
signor to Michelin & Cie, Clermont-Ferrand, France, a
French company
No Drawing. Filed Jan. 8, 1963, Ser. No. 249,994
Claims priority, application France, Jan. 9, 1962,
884,228
Int. Cl. C08d *13/38;* C08f *47/24*
U.S. Cl. 260—2.3                                         5 Claims

ABSTRACT OF THE DISCLOSURE

A process for regenerating natural or synthetic rubber comprising the steps of swelling the rubber, preferably in finely divided form, with a solvent, adding a devulcanization agent to devulcanize the rubber and dissolve the rubber in the solvent. The solvent is substantially nonvolatile in a temperature range of 180–230° C. The liquid or semi-liquid regenerated product may subsequently be incorporated as a plasticizer into other rubbers.

---

The present invention relates to a method of regenerating natural or synthetic vulcanized rubber, to the regenerated rubber product, to mixtures of the regenerated rubber product and natural or synthetic rubber and to products comprising such rubber mixtures, especially tires and conveyor and transmission belts.

The economic importance of regenerated rubber is due chiefly to its low cost. In certain applications, regenerated rubber is actually superior to fresh or new rubber. In general, however, regenerated rubber is inferior to fresh rubber for the reason that regenerated rubber is less resistant to wear and has higher hysteretic losses than fresh rubber. The inferiority of conventional regenerated rubber is due at least partly to the fact that rubber "regenerated" in accordance with conventional methods is not in fact restored fully to its pristine condition and is moreover in a form ill-suited for such further use as combination with fresh rubber.

Rubber has heretofore been regenerated by means of three different processes: the alkali process, the heater process, and the solution process. Only the last two processes will be discussed herein.

In accordance with the thermal method, vulcanized rubber is divided into small particles called "ground scrap." The ground scrap is then plasticized to a degree by heat. Plasticizing is carried further by "refining," which is a sheeting and folding operation carried out by means of rolls. It is customary to add oil to the ground scrap to facilitate the subsequent processing fine powder reclaim of the fine powder. It is likewise customary to add peptizing agents which make it possible to reduce the regeneration temperature.

Inasmuch as the object of the heater process is to obtain a reclaimed rubber which, while sufficiently plasticized to be worked, is nevertheless firm, the quantities of oil and peptizing agent used in relation to the quantity of ground scrap are always small. Care must be taken not to obtain a product which is too highly plasticized for the additional reason that such a product sticks to the refining equipment and thus does not lend itself readily to the subsequent mechanical treatment which completes this method of reclaiming.

In accordance with solution processes, a sufficient quantity of solvent is used to dissolve the rubber, and foreign matter, such as textile fibers, is filtered out. Thereafter, the solvent is evaporated and a residue of reclaimed rubber in solid form remains. A volatile solvent is used, so that elimination of the solvent from the reclaimed rubber is facilitated. Any solvent remaining in the reclaimed rubber is of negligible amount, and its presence is unintended.

A disadvantage of the conventional methods of reclaiming rubber resides in some undesirable physical characteristics of the resulting products. Even a macrographic examination of a rubber product comprising, for example, a mixture of regenerated rubber and natural or synthetic rubber shows that one rubber is not distributed uniformly with respect to the other—i.e., that random samples of the product are heterogeneous. Preferably the devulcanization or regeneration of the rubber should have resulted in a mass capable of forming a uniform or homogeneous mixture with the new nonvulcanized rubber.

An object of the present invention is to solve the problems outlined above.

Another object of the invention is to carry the devulcanization of rubber further than under the currently-employed methods.

Another object of the invention is to provide a method of reclaiming rubber which does not require any physical or mechanical working of the rubber.

A further object of the invention is to provide a method of reclaiming rubber in liquid or semi-liquid form with a view to its being used in such form in the production of rubber mixtures.

Another object of the invention is the production of a plasticizer having a rubber base.

Still another object of the invention is to provide a method for the manufacture of mixtures of reclaimed and new rubbers wherein the rubbers are uniformly distributed with respect to each other.

Another object of the invention is to provide a mixture comprising a new rubber or elastomer, a regenerated rubber, and carbon black wherein the rubbers and the carbon black are uniformly distributed with respect to one another.

Another object of the invention is to provide a method for the manufacture of tires containing a mixture of a new rubber or elastomer, a reclaimed or regenerated rubber, and carbon black wherein the rubbers and the carbon black are uniformly distributed with respect to each other.

A representative method of reclaiming or regenerating vulcanized rubber in accordance with the invention comprises the steps of swelling the rubber with a solvent, adding at least one devulcanizing agent to the rubber and solvent, and heating the rubber, solvent, and devulcanizing agent to devulcanize the rubber and dissolve the rubber in the solvent. The method further preferably comprises the initial step of dividing the rubber into small particles called ground scrap, and the solvent is preferably relatively non-volatile. The result is a liquid or semi-liquid regenerated rubber superior to all regenerated rubbers heretofore available.

The liquid or semi-liquid regenerated product may subsequently be incorporated as a plasticizer into compound of new or fresh rubber to form a final product in which the solvent is retained. The ratio of the weight of the regenerated liquid or semi-liquid rubber to the weight of fresh elastomer in the compound is at least 10% and may be as high as 50%.

For an understanding of further aspects of the invention, reference is made to the following detailed explanation.

In order to obtain, in accordance with the invention, the liquid or semi-liquid regenerated product referred to above, the following components are used: vulcanized rubber (preferably in finely divided form, hereinafter designated as "fine powder"); a solvent compatible with the rubber to which the regenerated product is to be added, the solvent being relatively nonvolatile—i.e., having low or negligible vapor pressure at around 200° C.—and preferably being a mineral oil; and a devulcanization agent.

The ground scrap may originate with vulcanizates of natural or synthetic rubber, such as SBR (also known as GR–S rubber; a copolymer of butadiene and styrene), polybutadienes, polyisoprenes, etc., or mixtures thereof.

In accordance with the invention, the ground scrap may contain several types of vulcanizates, without its being necessary to separate them or treat them separately.

Enough mineral oil or other solvent is mixed with the ground scrap to provide at the end of the process a regenerated product in liquid or semi-liquid form, i.e., a regenerated product at least partially in solution. The ratio of the weight of oil to the weight of ground scrap may vary between 45% and 200% and is preferably from 65% to 80% or 100%. A devulcanizing agent may be added to the oil before the oil and ground scrap are mixed.

When only the ground scrap and oil are mixed, the oil is absorbed by the ground scrap and causes the ground scrap to swell and form a dry and granular mass. Even if the ratio of the weight of oil to the weight of ground scrap is as high as 200%, there is nondissolution of the vulcanized rubber in the oil. When the devulcanization agent is added to the ground scrap, however, either with the oil or afterwards and the mass is heated, as in a drier, the rubber bonds are broken down sufficiently that the ground scrap dissolves in the oil and becomes a liquid or semi-liquid regenerated rubber mass.

The temperature within the drier and the duration of the drying operation depend on the quantity and the nature of the devulcanizing agent employed. It is advisable not to employ temperatures sufficiently high to cause cracking of the hydrocarbons. Temperatures of 180° C. to 230° C. are acceptable. At such temperatures, the duration of the process is approximately two to three hours. It is possible to treat the mass under pressure in an autoclave, but the risk of cracking in such case increases.

The use of a peptizing agent facilitates the devulcanizing reaction and the employment of lower temperatures. The ratio of the weight of peptizing agent to the weight of ground scrap ranges from 0.5% to 5%, depending on the quantity of oil, the temperature, and the intended duration of the operation.

If the oil quantity is small, the product is semi-liquid. The aforementioned ratio of the weight of oil to the weight of ground scrap of 45% is the lowest which provides an acceptable consistency of the regenerated product. With an amount of less than 45%, the regenerated rubber is not fluid enough to be conveyed in pipes or troughs and to be fully mixed with fresh rubber. At the other extreme, the aforementioned ratio of the weight of oil to the weight of ground scrap of 200% is the highest which provides a regenerated product acceptable for mixing with fresh rubber.

The devulcanizing process is completed when there is no more curdling. In order ot verify that there is no more curdling, one may dissolve a small quantity of the product obtained in benzene and filter it through a 100 mesh screen. If the devulcanizing process is completed, the residue on the 100 mesh screen is generally less than 1% and in no event more than a few percentage units. Alternatively, one may introduce the regenerated product containing some carbon black into a rubber-based compound containing only white fillers and determine the nature of the dispersion of the product in the mixture with the aid of a microscope.

The preferred solvents are, first, mineral oils obtained by the distillation of petroleum or coal, examples being fuel oil, petroleum jelly, paraffin, coal tar, coumarone oils, and anthracene oils, and second, vegetable and animal oils consisting of glyceric esters of fatty acids. Compounding of these oils is desirable though not necessary. A suitable compound oil may be made of coal tar, coumarone, or pine tar oils in combination with a petroleum oil.

The preferred devulcanizing agents are the mercaptans of the aromatic series, such as thiophenols, thiocresols, thioxylenols, and thionaphtols; disulphides of the same series; and metal salts of the aforementioned mercaptans, especially zinc salts.

Generally speaking, all commercial peptizing agents are suitable. Preferably, the devulcanizing agent, or at least one of the devulcanizing agents in case several are used, is a peptizing agent. Certain readily dehydrogenated products are especially suitable. Tetrafurfurylic alcohol, for example, has been used successfully.

The liquid or semi-liquid regenerated rubber mass does not stratify and is distinguished from the solid reclaims of the prior art in a number of important respects.

For example, a solid reclaim of the prior art must be worked mechanically to agglomerate it into a mass and render it plastic. But heavy mechanical working damages the elastomer. In accordance with the present invention no such working of the reclaim is necessary, to render it plastic.

Second most prior-art devulcanization processes increase rubber plasticity by molecular rupture rather than by an opening up of the inter-molecular bonds. A proof that the prior-art solid reclaimed rubber is denatured rather than in its pristine condition is that it retains to a certain extent the characteristics of elasticity exhibited by vulcanized rubber. In accordance with the present invention, the devulcanization of the rubber towards its original unvulcanized condition is carried further than with prior-art processes.

Third, prior-art reclaims are ill-suited for combination with fresh rubber. Prior-art reclaims tend to be associated with little or no oil and, being only partly devulcanized, have a molecular structure alien to that of fresh rubber. The oil-bearing liquid or semi-liquid wholly devulcanized reclaim of the present invention may be incorporated into fresh rubber much more intimately than prior-art reclaims. Even a macrographic examination reveals the superiority of a mixture incorporating the reclaim of the present invention over mixtures incorporating only solid reclaims. The former is homogeneous, whereas the latter suffer from a non-uniform distribution of the reclaimed and fresh rubbers with respect to each other. Consequently, mixtures of fresh and reclaimed rubbers in accordance with the present invention have better characteristics than prior-art mixtures, so that the relative quantities of reclaim and carbon black and other fillers may be increased in accordance with the present invention without damage to the quality of the mixture. On vulcanization, the reclaim of the present invention, being associated intimately with the fresh rubber is fully integrated into the total aggregate and participates in the fixing of the carbon black and other fillers.

Two of the most important uses of mixtures of fresh and reclaimed rubbers are in tire treads and conveyor belts, where maximum quantities of carbon black are desired because of the abrasion resistance it lends to the resulting rubber product. A solid reclaim having a nature alien to that of fresh rubber, acts as a filler and therefore weakens the structure of the mixture and reduces the relative quantity of carbon black it is possible to incorporate therein. Furthermore, being nonuniformly distributed in the mixture, a solid reclaim tends to cause nonuniform distribution of the carbon black and adversely to affect its ability to adhere to the rubber. The reclaim of the present invention is of course thoroughly mixable with fresh rubber. Moreover, it displays a certain activity of a polar nature which facilitates a bond with carbon black. Accordingly, the invention makes it possible to increase the ratio of carbon black in the mixture. It is well known that the maximum proportion of carbon black one is able to introduce into a compound for tire treads while maintaining good dispersion of the filler is in the neighborhood of 50% of the weight of the elastomer or possibly, of the total weight of the elastomer and the oil. If, however, a quantity of liquid reclaim ranging from 10% to 50% of the weight of the elastomer is mixed with the elastomer, one can with good dispersion incorporate a quantity of carbon black equalling 55% or even 60% of the total weight of elastomer and reclaim. This advantage, of special interest in the production of polybutadiene-based compounds, is further increased by the ratio of carbon black already contained in the reclaim, in case the latter derives from vulcanizates containing carbon black.

The carbon black should not be added directly to the reclaim. Instead, the reclaim should be added to and dispersed in the fresh rubber to form a mixture which is then combined with the carbon black. It is also possible to add the carbon black to the fresh rubber and thereafter to incorporate the reclaim. Finally, it is possible to add the carbon black and the reclaim to the fresh rubber in several portions and alternatingly.

An advantage of the use of a reclaim in accordance with the invention is that it facilitates the incorporation of Super-Abrasion-Furnace carbon black (SAF carbon black) which is very desirable because of its reinforcing properties but which has heretofore been mixable with elastomers only with difficulty.

Another advantage of the use of a reclaim made in accordance with the invention is that it acts as an inexpensive plasticizer that can be mixed in large quantities with more expensive elastomers to produce rubber compounds with improved qualities.

The regenerated rubber of the invention is particularly useful for the plasticizing of hard rubbers and in the manufacture of compounds based on synthetic rubber, especially of the GR-S or polybutadiene type.

The following are five examples of a liquid reclaim made in accordance with the invention:

EXAMPLE 1

| Ingredient: | Parts by weight |
|---|---|
| Ground scrap | 100 |
| Petroleum oil | 62 |
| Coumarone oil | 10 |
| Dixylyl disulfide | 3 |
| | 175 |

Heated 3 hours at 195° C.
Residue on 100-mesh screen after dilution in benzene: 1.2%.

EXAMPLE 2

| Ingredient: | Parts by weight |
|---|---|
| Ground scrap | 100 |
| Fuel oil | 95 |
| Castor oil | 5 |
| Xylyl mercaptan | 2 |
| | 202 |

Heated 3 hours at 202° C.
Residue on 100-mesh screen after dilution in benzene: 4.5%.

EXAMPLE 3

| Ingredient: | Parts by weight |
|---|---|
| Ground scrap | 100 |
| Petroleum oil | 90 |
| Pine tar | 8 |
| Peptizing agent (Pepton 22: trademark of American Cyanamid Co. for o,o'-Dibenzamidophenyl disulfide) | 2 |
| | 200 |

Heated 2 hours at 190° C.
Residue on 100-mesh screen after dilution in benzene: 4.1%.

EXAMPLE 4

| Ingredient: | Parts by weight |
|---|---|
| Ground scrap | 100 |
| Petroleum oil | 146 |
| Xylyl mercaptan | 4 |
| | 250 |

Heated 3 hours at 215° C.
Residue on 100-mesh screen after dilution in benzene: 0.55%.

EXAMPLE 5

| Ingredient: | Parts by weight |
|---|---|
| Ground scrap | 100 |
| Petroleum oil | 44 |
| Tetrahydrofurfuryl alcohol | 4 |
| Dixylyl disulfide | 2 |
| | 150 |

Heated 5 hours at 207° C.
Residue on 100-mesh screen after dilution in benzene: 3.2%.

In order better to illustrate the advantages of the regenerated product of the present invention, several examples are set forth hereinafter which relate to the regenerated product of Example 1 above. These following examples refer, successively, to compounds based on natural rubber (Table I), SBR (Table II), and polybutadiene rubber (Table III). In each of the three tables, comparison is made in three columns (A, B and C) between a compound without oil, a compound with a heater process reclaim and oil, and a compound with the reclaim of Example 1 above, the proportion of carbon black being the same in each of the three columns of a given table. A fourth column (D) in each table indicates a compound with a higher content of carbon black, which was made possible by using the liquid reclaim of the present invention.

TABLE I.—COMPOUNDS BASED ON NATURAL RUBBER

| Ingredient | Parts by weight | | | |
|---|---|---|---|---|
| | A | B | C | D |
| Natural rubber | 100 | 80 | 80 | 80 |
| Liquid reclaim (Example 1) | | | 20 | 20 |
| Heater process reclaim | | 12 | | |
| Petroleum oil | | 8 | | |
| Zinc oxide | 3 | 3 | 3 | 3 |
| Stearic acid | 2 | 2 | 2 | 2 |
| Phenyl beta naphthylamine | 1 | 1 | 1 | 1 |
| Philblack E (trademark of Phillips Chemical Co. for a super-abrasion furnace black) | 40 | 40 | 40 | 45 |
| Sulfur | 1.4 | 1.3 | 1.6 | 1.2 |
| Cyclohexyl-benzothiazole-sulfenamide | 0.8 | 0.8 | 0.8 | 0.8 |
| Total | 148.2 | 148.1 | 148.4 | 153.0 |
| Vulcanization for 20 minutes at 145° C.: | | | | |
| Dispersion of black | (1) | (2) | (3) | (4) |
| Modulus of elasticity, metric system | 229 | 218 | 213 | 220 |
| Hysteretic loss, percent | 13.4 | 18.0 | 16.2 | 17.8 |
| Breaking strength, kg./mm.² | 2.72 | 1.75 | 2.63 | 2.80 |
| Rupture elongation, percent | 520 | 405 | 510 | 537 |
| Tearing strength, metric system | 10.4 | 6.2 | 12.7 | 12.9 |

[1] Passable.
[2] Very bad.
[3] Good.
[4] Fairly good.

TABLE II.—COMPOUNDS BASED ON SBR

| Ingredient | Parts by weight | | | |
|---|---|---|---|---|
| | A | B | C | D |
| SBR 1500 [1] | 100 | | | |
| High molecular-weight SBR [2] without oil | | 62 | 62 | 62 |
| Liquid reclaim (Example I) | | | 38 | 38 |
| Heater process reclaim | | 22 | | |
| Petroleum oil | | 16 | | |
| Zinc oxide | 3 | 3 | 3 | 3 |
| Paraffin | 1 | 1 | 1 | 1 |
| Antioxidant | 1 | 1 | 1 | 1 |
| SAF | 50 | [3] 47 | [3] 47 | 52 |
| Sulfur | 1.4 | 1.2 | 1.3 | 1.0 |
| Total | 156.4 | 153.2 | 153.3 | 158.0 |
| Vulcanization 60 minutes at 144° C.: | | | | |
| Dispersion of black | [4] | [5] | [4] | [6] |
| Modulus of elasticity, metric system | 185 | 192 | 195 | 202 |
| Hysteretic loss, percent | 22.5 | 23.5 | 20.8 | 24.4 |
| Breaking strength, kg./mm.$^2$ | 2.40 | 1.30 | 3.03 | 2.17 |
| Rupture elongation, percent | 515 | 380 | 475 | 480 |
| Tearing strength, metric system | 3.8 | 2.6 | 3.6 | 4.3 |

[1] General purpose styrene-butadiene copolymer under ASTM designation with 23.5% bound styrene and Mooney viscosity ML-452.
[2] Cold-polymerized general purpose styrene-butadiene copolymer such as precedent, but with a Mooney viscosity ML-4120 at 212° F.
[3] The quantity of black is reduced in relation to mixture A, in order to take into consideration the black contributed by the reclaim.
[4] Good.
[5] Fair.
[6] Fairly good.

TABLE III.—COMPOUNDS BASED ON POLYBUTADIENE COMPARED

| Ingredient | Parts by weight | | | |
|---|---|---|---|---|
| | A | B | C | D |
| Cis 4-polybutadiene (Trademark of Phillips Chemical Co. for polybutadiene with essentially a cis-1,4 structure) | 50 | 40 | 40 | 40 |
| Natural rubber | 50 | 40 | 40 | 40 |
| Reclaim (Example I) | | | 25 | 25 |
| Heater process reclaim | | 15 | | |
| Petroleum oil | 5 | 10 | | |
| Zinc oxide | 3 | 3 | 3 | 3 |
| Stearic acid | 3 | 3 | 3 | 3 |
| Antioxidant | 1 | 1 | 1 | 1 |
| Philblack O (trademark of Phillips Chemical Co. for a high-abrasion furnace black) | 50 | 50 | 50 | 55 |
| Sulfur | 2 | 2 | 2 | 1.4 |
| Accelerator (N-oxydiethylene benzothiazol-2-sulfenamide) | 0.6 | 0.6 | 0.6 | 0.6 |
| Total | 164.6 | 164.6 | 164.6 | 169.0 |
| Vulcanization 60 minutes at 144° C.: | | | | |
| Dispersion of black | (1) | (2) | (1) | (1) |
| Modulus of elasticity, metric system | 200 | 222 | 210 | 218 |
| Hysteretic loss, percent | 14 | 18.5 | 16.2 | 18.4 |
| Breaking strength, kg./mm.$^2$ | 2.15 | 1.40 | 2.05 | 2.20 |
| Rupture elongation, percent | 490 | 300 | 480 | 520 |
| Tearing strength, metric system | 5.5 | 4.2 | 5.0 | 6.8 |

[1] Good.
[2] Average.

In all of the tables, column A refers to a test compound without reclaim, column B to a classical compound with oil in an amount equal to that contributed to the compound of column C by the liquid reclaim of Example 1, column C to a compound as in column B but substituting the liquid reclaim of Example 1, and column D to a compound wherein advantage was taken of the presence of the liquid reclaim of Example 1 by increasing the amount of carbon black in the compound.

The figures for the breaking strength and the breaking elongation show that the liquid reclaim combined with natural rubber (Table I) produces a compound having substantially the same properties as a compound without reclaim yet having approximately 20% less of the fresh elastomer. Similar observations apply to the polybutadiene-based rubber (Table III). In the case of the SBR-based rubber, there was a slight deterioration of properties of the compounds containing a reclaim as compared to the compound not containing a reclaim. This is more than offset in many applications, however, by the economy resulting from the SBR, saving facilitated by the use of the reclaim of Example 1.

Moreover, all of the tables, including Table II, clearly show the superiority of the reclaim of the invention over the solid prior-art reclaim.

The compounds in Table III rank in descending order of quality, as follows:

(D) Compound with liquid regenerated rubber of the present invention and increased ratio of carbon black;

(A) Compound without regenerated product of any kind;

(C) Compound with liquid regenerated product and same ratio of carbon black as compound A;

(B) Compound with the same ratio of carbon black as compound A and classical regenerated rubber.

Many modifications within the spirit and scope of the invention will be apparent to those skilled in the art in the light of the previous disclosure. Accordingly, the invention encompasses all of the modifications which fall within the scope of the appended claims, in which the term "rubber" is used in a generic sense to include both natural and synthetic rubber.

I claim:

1. A method of regenerating vulcanized rubber, the rubber being of a type vulcanizable with sulfur, comprising the steps of dividing said rubber into particles, swelling said particles with a solvent, the ratio of the weight of said solvent to the weight of said rubber being within the range of 45% to 200%, adding at least one devulcanizing agent reactive with vulcanized rubber to said rubber particles and solvent, and heating said rubber particles, solvent, and devulcanizing agent to a temperature of 180° C. to 230° C. for a period of approximately two to three hours to devulcanize said rubber and dissolve said rubber in said solvent, said solvent being substantially nonvolatile at said temperature and atmospheric pressure.

2. A method of forming a rubber mixture comprising the steps of dividing a vulcanized rubber into particles, the rubber being of a type vulcanizable with sulfur, swelling said rubber particles with a solvent, the ratio of the weight of said solvent to the weight of said rubber being within the range of 45% to 200%, adding at least one devulcanizing agent reactive with vulcanized rubber to said vulcanized rubber and solvent, heating said rubber particles, solvent, and devulcanizing agent to a temperature of 180° C. to 230° C. for a period of approximately two to three hours to devulcanize said vulcanized rubber and dissolve said vulcanized rubber in said solvent, said solvent being substantially nonvolatile at said temperature and atmospheric pressure, mixing said dissolved devulcanized rubber with a compound of fresh rubber, said fresh rubber being of a type vulcanizable with sulfur, and afterwards incorporating carbon black into the mixture of said dissolved devulcanized rubber and said compound of fresh rubber.

3. An at-least-partially-liquid product comprising a devulcanized rubber and a solvent for said rubber, said solvent being compatible with said rubber and substantially nonvolatile at a temperature of 180° C. to 230° C. and atmospheric pressure and said rubber being of a type vulcanizable with sulfur.

4. A mixture comprising fresh rubber of a type vulcanizable with sulfur, a regenerated rubber of a type vulcanizable with sulfur, and a solvent compatible with said fresh rubber, said regenerated rubber being at least partially dissolved in said solvent, said solvent being substantially nonvolatile at a temperature of 180° C. to 230° C. and atmospheric pressure, and the percentage of the weight of said regenerated rubber to the weight of said fresh rubber being within the range of 10% to 50%

5. A mixture as defined in claim 4 in which said fresh rubber is of a high Mooney degree lowered by said regenerated rubber.

(Reference on following page)

References Cited

UNITED STATES PATENTS

| | | | |
|---|---|---|---|
| 2,800,462 | 7/1957 | Sverdrup | 260—2.3 |
| 3,043,786 | 7/1962 | White | 260—2.3 |
| 3,048,218 | 8/1962 | Gunther | 260—2.3 |
| 3,057,390 | 10/1962 | Pattison et al. | 260—2.3 |
| 2,471,866 | 5/1949 | Eby | 260—2.3 |
| 2,477,809 | 8/1949 | Kelly | 260—2.3 |
| 2,640,035 | 5/1953 | Brown et al. | 260—2.3 |
| 2,676,636 | 4/1954 | Sarbach | 260—2.3 |

FOREIGN PATENTS

| | | | |
|---|---|---|---|
| 14,659 | 6/1914 | Great Britain | 260—715 |

MURRAY TILLMAN, Primary Examiner

M. J. TULLY, Assistant Examiner

U.S. Cl. X.R.

260—5, 33.6, 34.2, 79.5, 715, 729, 894

PO-1050
(5/69)

UNITED STATES PATENT OFFICE
CERTIFICATE OF CORRECTION

Patent No. 3,563,922  Dated February 16, 1971

Inventor(s) Jean-Marie Massoubre

It is certified that error appears in the above-identified patent and that said Letters Patent are hereby corrected as shown below:

Column 7, line 10, "SAF" should read -- SAF Black --; line 17, "3.03" should read -- 2.03 --; line 20 (in footnotes 1 and 2) "ML-452" and "ML-4120" should be spaced thusly -- ML-4 52 -- and -- ML-4 120 --.

Signed and sealed this 26th day of October 1971.

(SEAL)
Attest:

EDWARD M. FLETCHER, JR.　　　ROBERT GOTTSCHALK
Attesting Officer　　　　　　　Acting Commissioner of Patents